(12) United States Patent
Montoya

(10) Patent No.: US 9,625,339 B2
(45) Date of Patent: *Apr. 18, 2017

(54) PASSIVE PRESSURE SENSING USING SENSOR WITH DISK RESONATOR

(71) Applicant: CHEVRON U.S.A. INC., San Ramon, CA (US)

(72) Inventor: James Daniel Montoya, Santa Fe, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/609,176

(22) Filed: Jan. 29, 2015

(65) Prior Publication Data

US 2015/0260594 A1    Sep. 17, 2015

Related U.S. Application Data

(63) Continuation of application No. PCT/US2014/070964, filed on Dec. 17, 2014.

(60) Provisional application No. 61/952,547, filed on Mar. 13, 2014.

(51) Int. Cl.
| | |
|---|---|
| *G01L 7/00* | (2006.01) |
| *G01L 11/00* | (2006.01) |
| *G01L 9/00* | (2006.01) |

(52) U.S. Cl.
CPC ............ *G01L 9/008* (2013.01); *G01L 9/0022* (2013.01)

(58) Field of Classification Search
CPC ....... G01L 9/008; G01L 9/04; G01L 19/0618; G01L 23/222; G01L 23/223; G01L 9/0022; G01L 9/007; G01L 23/12; G01L 9/10; G01H 11/02; Y10T 29/4902; Y10T 29/49877
USPC .... 73/723, 703–704, 715, 654, 35.09, 35.11, 73/728
See application file for complete search history.

(56) References Cited

U.S. PATENT DOCUMENTS

| | | | |
|---|---|---|---|
| 3,274,828 A | 9/1966 | Pulvari | |
| 4,175,243 A | 11/1979 | Corbett | |
| 7,398,690 B1 * | 7/2008 | Erickson | G01L 23/10 73/702 |
| 2002/0062696 A1 * | 5/2002 | Burczyk | G01L 19/003 73/715 |
| 2012/0096945 A1 * | 4/2012 | Sato | G01L 9/008 73/723 |

OTHER PUBLICATIONS

International Search Report for PCT/US2014/0470964, mailed Mar. 20, 2015.

* cited by examiner

*Primary Examiner* — Harshad R Patel
*Assistant Examiner* — Brandi Hopkins
(74) *Attorney, Agent, or Firm* — King & Spalding LLP

(57) ABSTRACT

A pressure sensor for sensing pressure of a fluid includes a diaphragm flexure and a crystal retaining flexure. The diaphragm flexure is designed to exert imparted force on the crystal retaining flexure. The imparted force is proportional to fluid pressure exerted on the diaphragm flexure. The pressure sensor further includes a resonator having a round outer perimeter. A portion of the crystal retaining flexure is positioned between the diaphragm flexure and the resonator. The crystal retaining flexure is designed to exert a load on the resonator. The load results from the imparted force exerted on the crystal retaining flexure by the diaphragm flexure.

20 Claims, 5 Drawing Sheets

PASSIVE PRESSURE SENSING USING SENSOR WITH DISK RESONATOR

CROSS-REFERENCE TO RELATED APPLICATIONS

The present application is a continuation of and claims priority to International Application No. PCT/US2014/070964, filed on Dec. 17, 2014, and titled "Passive Pressure Sensing," which claims priority under 35 U.S.C. Section 119(e) to U.S. Provisional Patent Application No. 61/952,547, filed Mar. 13, 2014, and titled "Passive Pressure Sensing," the entire contents of which are incorporated herein by reference.

TECHNICAL FIELD

The present disclosure relates generally to pressure sensing and more particularly to pressure sensing using a piezoelectric pressure transducer.

BACKGROUND

Pressure sensors (also commonly known as pressure transducers) are often used for sensing fluid pressure in applications such as oil and gas production. For example, a fluid that is monitored for pressure may apply fluid pressure on a pressure sensor, and the pressure sensor may sense the fluid pressure and generate, for example, a signal indicative of the applied fluid pressure. Some existing pressure sensors may include one or more resonators to sense fluid pressure.

Generally, active electronic components are often used along with resonators to sense the fluid pressure. However, due to the relatively low temperature tolerance of active electronic components, pressure sensors that employ active electronic components may have limited use in relatively high temperature environments. Thus, pressure sensors that include active electronic components may have reliability issues compared to pressure sensors that use only passive components that become exposed to a harsh environment. Further, a pressure sensor that includes active electronic components may be relatively more expensive than a pressure sensor that uses only passive components.

Accordingly, a pressure sensor that can sense fluid pressure, for example, in an oil well, using a resonator and without active components or with very few high temperature tolerant active components that are exposed to a harsh environment is desirable.

SUMMARY

The present disclosure relates generally to pressure sensing using a piezoelectric pressure transducer. In an example embodiment, a pressure sensor for sensing pressure of a fluid includes a diaphragm flexure and a crystal retaining flexure. The diaphragm flexure is designed to exert an imparted force on the crystal retaining flexure that is proportional to fluid pressure exerted on the diaphragm flexure. The pressure sensor further includes a disk resonator having a round outer perimeter. In certain exemplary embodiments, the resonator may be constructed of crystal or ceramic, having varying frequencies, and varying geometries (such as double beam, plate, etc.). A portion of the crystal retaining flexure is positioned between the diaphragm flexure and the resonator. The crystal retaining flexure is designed to exert a load (i.e., a specific allowable portion of the resultant imparted pressure loading) onto the resonator. The load results from the imparted force exerted on the crystal retaining flexure by the diaphragm flexure. The loading will cause a frequency change in the resonator which is proportional to the loading, which is the fundamental methodology for sensing the fluid pressure. This configuration allows a precise and variable load to be applied to the resonator for specific pressure sensing requirements.

In another example embodiment, a system for measuring a pressure of a fluid includes a signal source and a signal receiver to determine the crystal resonant frequency. The system further includes a pressure sensor that includes a diaphragm flexure and a crystal retaining flexure. The diaphragm flexure is designed to exert imparted force on the crystal retaining flexure that is proportional to fluid pressure exerted on the diaphragm flexure. The pressure sensor further includes a resonator having a round outer perimeter. A portion of the crystal retaining flexure is positioned between the diaphragm flexure and the resonator. The crystal retaining flexure is designed to exert a load on the resonator. The load results from the imparted force exerted on the crystal retaining flexure by the diaphragm flexure. The resonator is electrically coupled to the signal source and to the signal receiver. The pressure sensor may be calibrated between its operational parameters of pressure and temperature with calibration equipment to ensure proper and accurate operation.

In another example embodiment, a method for measuring a pressure of a fluid includes generating a signal by a signal source and receiving the signal by a signal receiver through a pressure sensor. The method further includes processing the signal to determine the pressure sensed by the pressure sensor. The pressure sensor includes a diaphragm flexure and a crystal retaining flexure. The pressure sensor further includes a resonator having a round outer perimeter. A portion of the crystal retaining flexure is positioned between the diaphragm flexure and the resonator. The crystal retaining flexure is designed to exert a load on the resonator. The load results from the imparted force exerted on the crystal retaining flexure by the diaphragm flexure. Receiving the signal through the pressure sensor includes receiving the signal through the resonator.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1A:
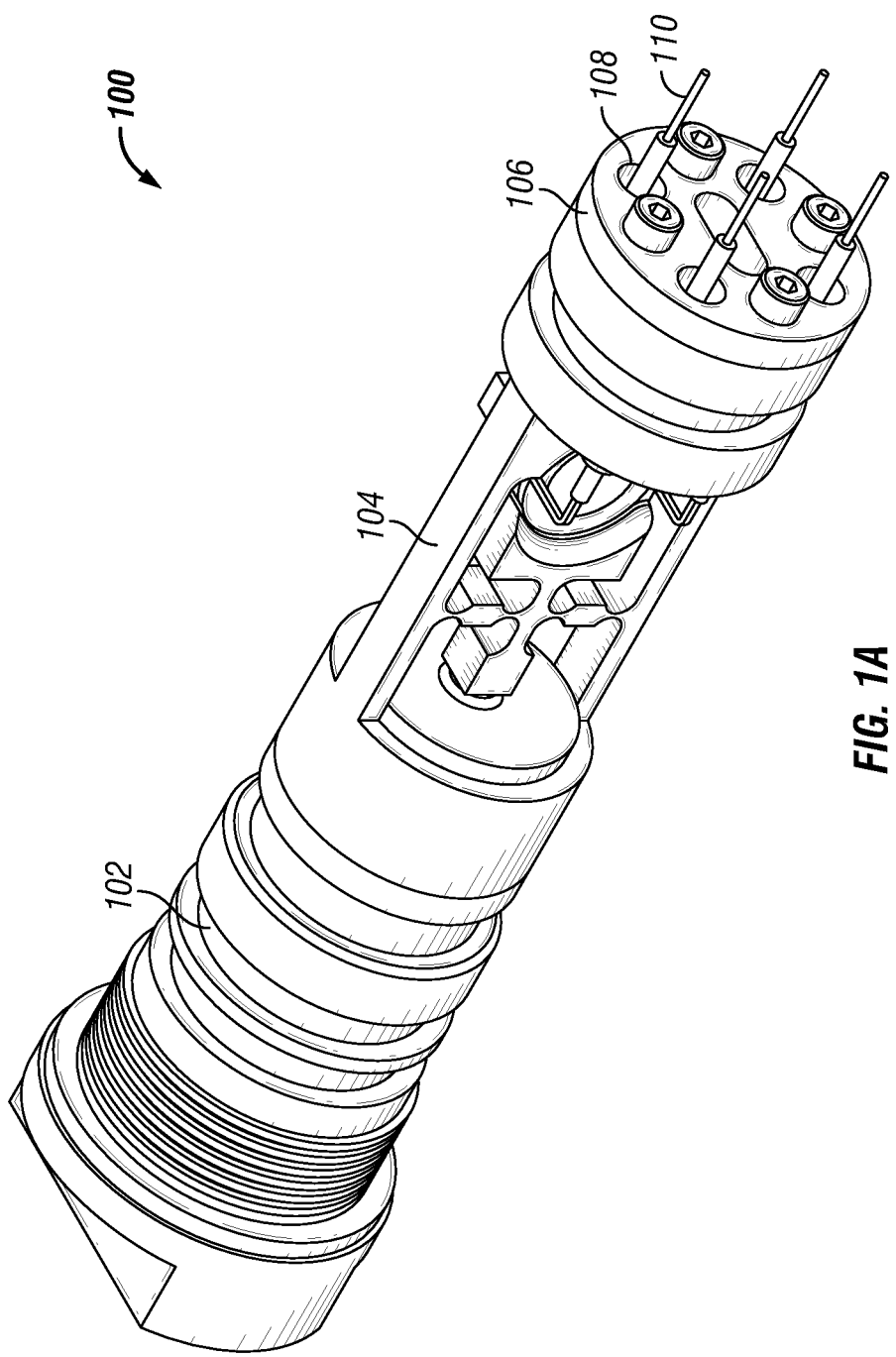
FIG. 1A is a perspective view of a pressure sensor for sensing a pressure of a fluid in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1B:
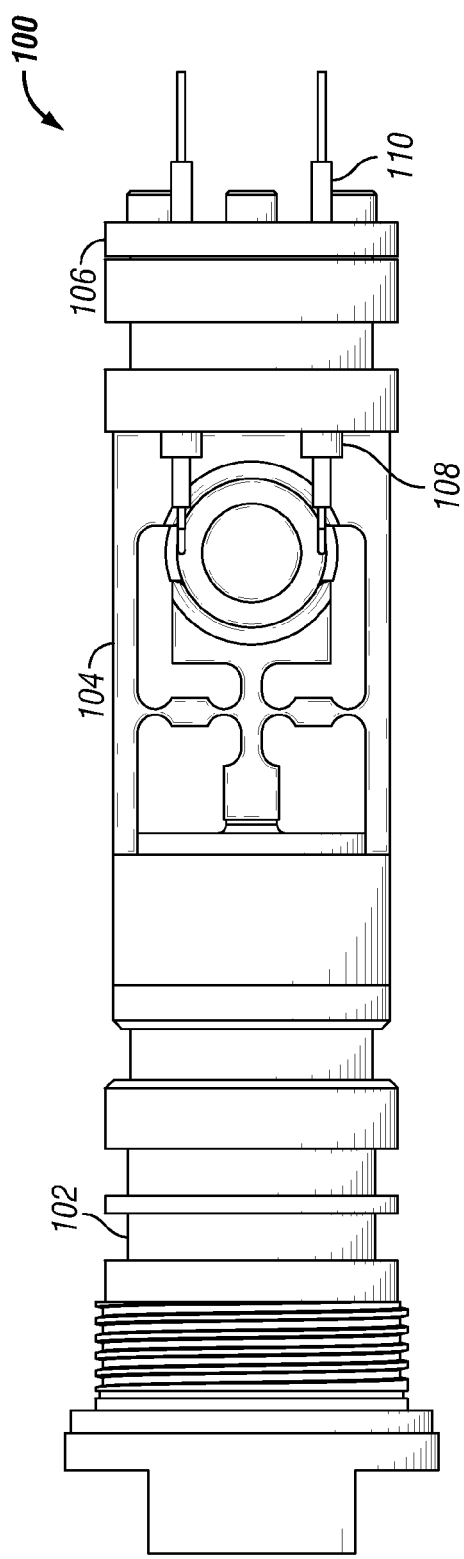
FIG. 1B is a side view of the pressure sensor of FIG. 1A, in accordance with an example embodiment.
Figure 1C:
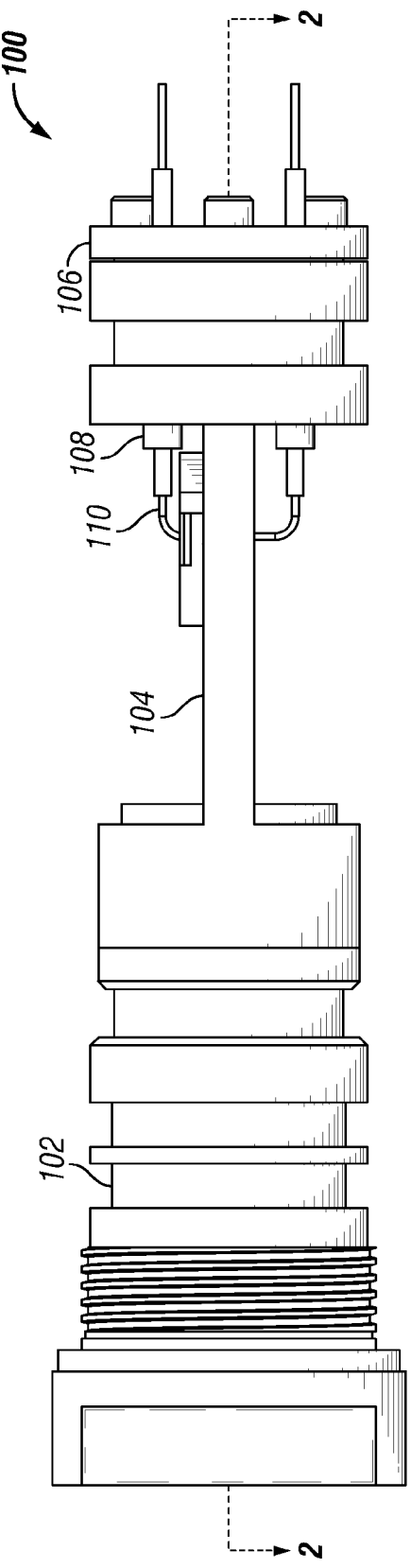
FIG. 1C is a top view of the pressure sensor of FIG. 1A, in accordance with an example embodiment.

Turning now to the drawings, FIGS. 1A-1C illustrate a pressure sensor 100 for sensing a pressure of a fluid according to an example embodiment. The pressure sensor 100 operates by associating pressure exerted by a fluid ("outside fluid") that is outside of the pressure sensor 100 to a resonance frequency (also referred to as resonant frequency) of a resonator (i.e., a piezoelectric resonator) of the pressure sensor 100. In some example embodiments, the pressure sensor 100 may be placed in the annulus portion of a well between the casing and the production tubing of a wellbore. However, the pressure sensor 100 can be placed in any high temperature and/or pressure sensing environment, such as a steam pipe, turbine, reactor, etc. The pressure sensor 100 is configured to sense a wide range of fluid pressure levels over a wide range of temperature conditions. In some example embodiments, the pressure sensor 100 is configured to operate in an environment having a temperature that ranges from below 32 degrees Fahrenheit (° F.) (gas pressure measurements) to over 600° F. In some example embodiments, the pressure sensor may also sense pressure levels ranging from, but not limited to about 0 pound per square inch (PSI) to over 10,000 PSI. In certain exemplary embodiments, the pressure sensor may sense pressure levels up to about 30,000 PSI by modifying the geometry and thereby the stiffness of the coupled crystal retaining and diaphragm flexures.

As illustrated in FIGS. 1A-1C, the pressure sensor 100 includes a pressure head 102, a crystal retainer 104, and a retaining disk 106. One or more wires 110 may extend through corresponding passageways 108 to electrically couple the resonator of the pressure sensor 100 to a signal source/signal receiver. In certain embodiments, the pressure sensor 100 also includes a housing (not shown) that covers the exterior of the pressure sensor 100. For example, the pressure head 102 and the retaining disk 106 may be configured to mate with respective ends of the housing so as to substantially cover the crystal retainer 104. In some example embodiments, the length of the pressure sensor 100 inclusive of the pressure head 102, the crystal retainer 104, and the retaining disk 106 may be about 7 inches, and the diameter of the pressure sensor 100 may be approximately 1 inch. In alternative embodiments, the pressure sensor 100 may be much larger or smaller than 7 inches in length, and may be larger or smaller than 1 inch in height.

As described in more detail below, the pressure head 102 may include a fluid inlet that may be coupled to a pipe that connects the pressure sensor 100 to the outside fluid to be monitored for pressure. For example, the pipe may be coupled to a structure that isolates pressure sensor 100 from the outside fluid. Alternatively, the pressure sensor 100 may be enclosed in an outer housing or sleeve (not shown) that protects the pressure sensor 100 from exposure to the environment. To illustrate, the fluid inlet of the pressure head 102 may be exposed to the external environment, and the pressure sensor 100 may sense the pressure of the fluid through the fluid inlet (for example, the fluid inlet 202 shown in FIG. 2).

As described in more detail below, the pressure sensor 100 includes a resonator that oscillates at a frequency that depends on the amount of pressure/loading applied to the resonator. The pressure sensor 100 imparts a load that is proportional to the fluid pressure onto the resonator in the pressure sensor 100 such that the pressure exerted on the resonator is less than and proportional to the fluid pressure. By allowing only a fraction of the fluid pressure load to be exerted on the resonator, the integrity of the resonator can be maintained. The relationship between the fluid pressure and the load exerted on the resonator can be used to associate a resonance frequency of the resonator to the fluid pressure. Because the resonance frequency of the resonator is dependent on the load exerted onto the resonator, the resonance frequency of the resonator may be used to determine the fluid pressure because of the relationship between the fluid pressure and the load exerted on the resonator. The pressure sensor 100 may be calibrated between its operational parameters of pressure and temperature with calibration equipment to ensure reliable operation.

Figure 2:
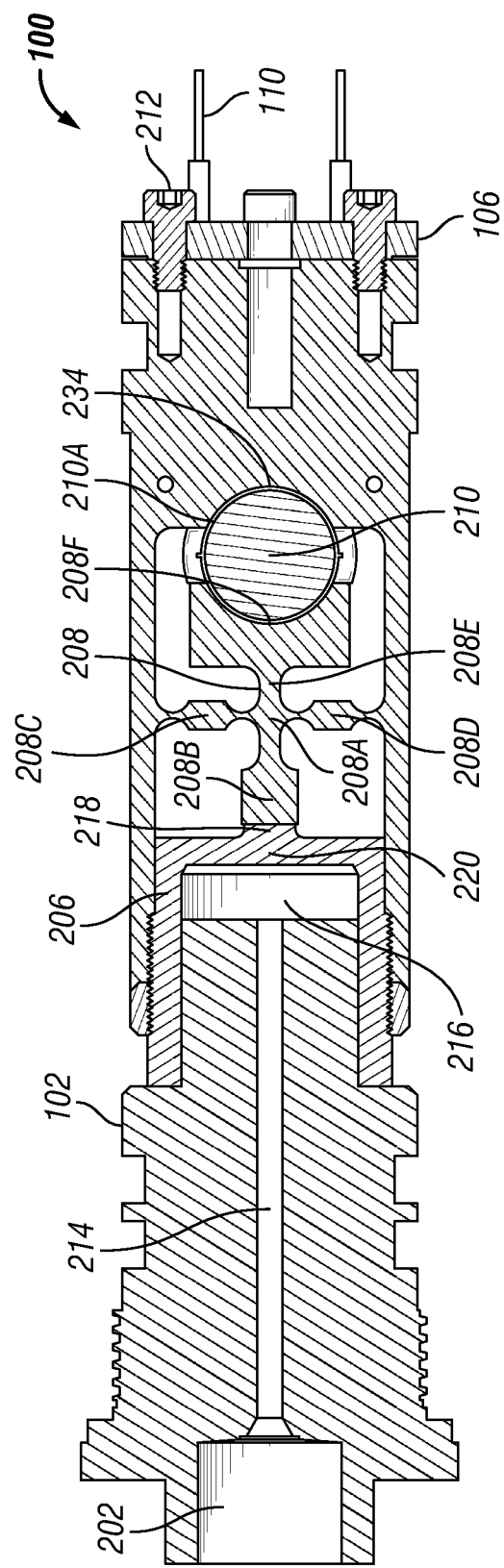
FIG. 2 illustrates a longitudinal cross-section of the pressure sensor of FIG. 1A, taken along section 2-2 of FIG. 1C, in accordance with an example embodiment.

Referring to FIG. 2, FIG. 2 illustrates a longitudinal cross-section of the pressure sensor 100, along section 2-2 of FIG. 1C, in accordance with an example embodiment. As illustrated in FIG. 2, the pressure sensor 100 includes the pressure head 102, the crystal retainer 104, and the retaining disk 106. The pressure sensor 100 further includes a diaphragm flexure 206, a crystal retaining flexure 208, and a resonator 210. The crystal retaining flexure 208 is positioned between the diaphragm flexure 206 and the resonator 210 on a first side of the resonator 210. In some example embodiments, the crystal retainer 104 includes the crystal retaining flexure 208.

In some example embodiments, the diaphragm flexure 206, the crystal retaining flexure 208, and the resonator 210 are in physical contact with the respective adjacent components. To illustrate, the diaphragm flexure 206 is in contact with the crystal retaining flexure 208, and the crystal retaining flexure 208 is in contact with the resonator 210. In certain example embodiments, a protrusion 218 of the diaphragm flexure 206 may be in contact with the crystal retaining flexure 208.

In some example embodiments, each of the diaphragm flexure 206 and the crystal retaining flexure 208 may be made from steel, such as stainless steel. Further, the retaining disk 106 may also be made from steel or another structurally adequate and otherwise suitable material. In embodiments of the pressure sensor 100 that include a housing (not shown), the housing may also be made from steel or another structurally adequate and otherwise suitable material. In some example embodiments, the resonator 210 may be a quartz resonator, such as an ultra-low frequency (~20-50 kHz) quartz crystal resonator, and thus may be well suited for deep well applications since low frequency translates to less signal attenuation and thereby longer passive detection distances. In other embodiments, the resonator 210 may be a ceramic resonator and may have alternate geometric configurations than shown in FIG. 2. Generally, the resonator 210 is electrically coupled to a signal source/signal receiver via electrical conductors. For example, one or more wires 110 that are electrically isolated from the crystal retaining flexure 208 may extend through the crystal retaining flexure 208 (e.g., through the passageways 108 shown in FIGS. 1A and 1B) to electrically couple the resonator 210 to a signal source/signal receiver.

Generally, the diaphragm flexure 206, the crystal retaining flexure 208, the resonator 210, and at least a portion of the pressure head 102 may be positioned within a housing (not shown). In some example embodiments, the diaphragm flexure 206 may be attached to the housing at the edge portions of the diaphragm flexure 206 such that a middle portion 220 of the diaphragm flexure 206 can move laterally in response to pressure applied to the diaphragm flexure 206 by a fluid in a chamber 216. The movement of the diaphragm flexure 206 laterally applies a force on a first end of the crystal retaining flexure 208. The structure of the crystal retaining flexure 208 is such that a uniform compressive load (with no moments) can thereby be imparted on the resonator 210. For example, the crystal retaining flexure 208 may serve to reduce the amount of load transferred to the resonator 210 from the diaphragm flexure 206 and thereby reduce the risk of damage to the resonator 210. In certain exemplary embodiments, the crystal retaining flexure 208 is generally in the shape of a plus (+) sign and includes a center 208a with a first, second, third, and fourth extension 208b, 208c, 208d, 208e, protruding therefrom. The first extension 208b is in contact with the protrusion 218 of the diaphragm flexure 206. The second and third extensions 208c, 208d are perpendicular to the first and fourth extensions 208b, 208e. The fourth extension 208e includes a mounting portion 208f configured to receive a portion of a round outer perimeter 210a of the resonator 210. To illustrate, the mounting portion 208f may be curved to match the shape of the portion of the round outer perimeter 210a such that the mounting portion 208f is in contact with the portion of the round outer perimeter 210a.

Because the housing and the diaphragm flexure 206 may be made from an electrically conductive material, the housing and the diaphragm flexure 206 may be electrically coupled to each other. Further, a particular terminal (e.g., a ground potential terminal) of the resonator 210 may be coupled to the crystal retaining flexure 208 such that the particular terminal is electrically coupled to the housing 106 through the diaphragm flexure 206 that is in contact with the crystal retaining flexure 208. In some example embodiments, the housing may be coupled to a casing (e.g., a conductive pipe at ground potential) of a wellbore that is electrically isolated from a production tubing (e.g., a smaller conductive pipe) that the casing surrounds. For example, the casing may be coupled to a signal source or receiver that may be above ground.

In one embodiment, the resonator 210 may be disk-shaped. For example, the resonator 210 may have the round outer perimeter 210a. When the resonator 210 is stressed or loaded in a specific manner, there may be a measurable change in the mechanical resonance frequency along a broad side of the disk-shaped resonator. Generally, the resonator 210 may be at least partially retained by the fourth extension 208e and by a curved structure 234 of the crystal retainer 104. For example, a portion of the round outer perimeter 210a may be positioned against the curved mounting portion 208f, and an opposite portion of the round outer perimeter 210a may be positioned against curved structure 234. To illustrate, the crystal retaining flexure 208 may exert a load on the resonator 210 at the portion of the round outer perimeter 210a of the resonator 210 that is in contact with the curved mounting portion 208f, and the curved structure 234 may exert the same amount of force (reactive force) on the opposite portion of the round outer perimeter 210a that is in contact with the structure 234.

The retaining disk 106 is positioned at an end of the crystal retaining flexure 208 and in one embodiment, serves to retain a temperature-sensitive pre-packaged canned crystal. As illustrated in FIG. 2, the retaining disk 106 may be coupled to the crystal retainer 104 by screws 212. Alternatively or in addition, the retaining disk 106 may be coupled to the crystal retainer 104 by other means including other fasteners and/or soldering/brazing/welding. In some example embodiments, the retaining disk 106 and the crystal retainer 104 may include one or more passageways 108 (shown in FIGS. 1A and 1B) that are used to route, for example, the one or more electrical wires 110 to the resonator 210. For example, the one or more wires 110 may electrically couple the resonator 210 to a production tubing (e.g., a steel pipe) of an oil well that may be used to carry a signal between the pressure sensor 100 and, for example, a signal source/receiver that may be above ground.

In some example embodiments, the pressure head 102 includes a fluid inlet 202 and a channel 214 extending between the fluid inlet 202 and the chamber 216. As illustrated in FIG. 2, the chamber 216 is partially bounded by the diaphragm flexure 206. For example, the chamber 216 may contain an isolation fluid that is separated by a structure (for example, a bellows) from the outside fluid that is monitored for pressure. To illustrate, the fluid in the chamber 216 may be a hydraulic fluid. The fluid contained in the chamber 216 may exert fluid pressure on the diaphragm flexure 206. For example, the fluid pressure exerted on the diaphragm flexure 206 by the fluid contained in the chamber 216 may be substantially the same amount of pressure exerted by the outside fluid that is monitored by the pressure sensor 100. In some alternative embodiments, the chamber 216 may contain the outside fluid instead of an isolation fluid. To illustrate, in some example embodiments, the pressure sensor 100 may not include a separator.

The pressure exerted on the resonator 210 is related to the fluid pressure exerted on the diaphragm flexure 206 by the fluid in the chamber 216. To illustrate, the diaphragm flexure 206 is designed to exert the imparted force on the crystal retaining flexure 208, which then applies a uniform load on the resonator 210. In some example embodiments, the resonator 210 may oscillate at a particular resonance frequency in response to load applied to the resonator 210 by the crystal retaining flexure 208.

In some example embodiments, a pipe (e.g., a pipe 308 shown in FIG. 3) that is attached to the fluid inlet 202 may contain the same fluid that is contained in the chamber 216 and may serve as a passageway to transfer pressure from the outside fluid to the fluid in the chamber 216. For example, the pressure of the outside fluid can be transferred to an isolation fluid in the chamber 216 through the pipe and the channel 214. Although a single channel and a single fluid inlet are shown in FIG. 2, in alternative embodiments, the pressure head 102 may include multiple channels and/or multiple fluid inlets. Further, in alternative embodiments, the pressure head 102 may include multiple fluid inlets and multiple chambers that are partially bounded by the diaphragm flexure 206.

After a reference resonance frequency of the resonator 210 is determined based on a reference pressure that is exerted on the diaphragm flexure 206 by the fluid contained in the chamber 216, a resonance frequency of the resonator 210 resulting from a change in the pressure exerted on the resonator 210 may be used to determine the pressure exerted by the fluid contained in the chamber 216. To illustrate, because the resonance frequency of the resonator 210 is dependent on the load exerted on the resonator 210, the relationship between the fluid pressure exerted on the diaphragm flexure 206, the imparted force exerted on the crystal retaining flexure 208 by the diaphragm flexure 206, and the load that is exerted on the resonator 210 by the crystal retaining flexure 208 can be used to associate a resonance frequency of the resonator 210 to the fluid pressure.

In general, after determining a reference oscillation frequency of the resonator 210, for example, that corresponds to an initial amount (e.g., substantially zero) of the fluid pressure exerted on the diaphragm flexure 206, changes in the fluid pressure exerted on the diaphragm flexure 206 may be determined based on the corresponding change in the oscillation frequency of the resonator 210, for example, relative to the reference oscillation frequency.

By using high temperature compliant metal and high temperature compliant crystal (e.g., quartz, gallium phosphate of varying frequencies) components and by eliminating the placement of active electronic components within the pressure sensor 100, the pressure sensor 100 allows pressure sensing to be performed, for example, in relatively high temperature environments. Further, in some example embodiments, the pressure sensor 100 may be produced more cost effectively than pressure sensors that include generally more costly active components. In some alternative embodiments, the pressure sensor 100 may include some active components such as a gain device/amplifier (that are high temperature tolerant) for deep well applications.

Figure 3:
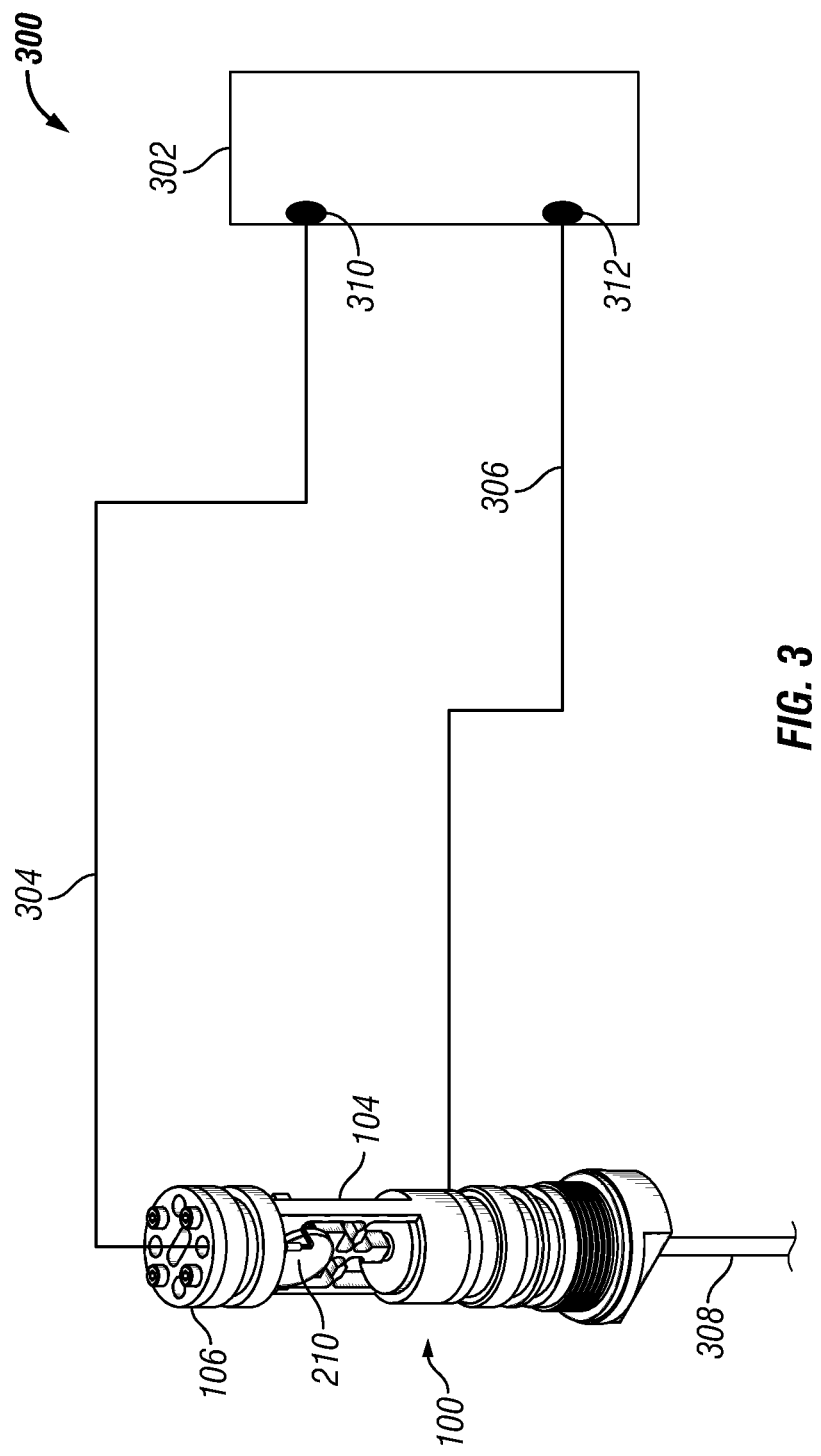
FIG. 3 illustrates a system for measuring a pressure of a fluid using the pressure sensor of FIG. 1A in accordance with an example embodiment.

FIG. 3 illustrates a system 300 for measuring a pressure of a fluid using the pressure sensor 100 (FIGS. 1A-1C) in accordance with an example embodiment. The system 300 includes a network analyzer 302 and the pressure sensor 100. In an example embodiment, the network analyzer 302 includes a signal source that generates a signal and a signal receiver that receives a signal. For example, the network analyzer 302 may output a signal via the first port 310 and may receive a signal via the second port 312. Alternatively, the network analyzer 302 may output a signal via the second port 312 and may receive a signal via the first port 310. To illustrate, the first port 310 and the second port 312 may be electrically coupled to terminals/electrodes of the resonator 210 of the pressure sensor 100 such that an electrical signal can travel from/to the first port 310 and the second port 312 to/from the terminals/electrodes of the resonator 210. For example, the first port 310 may be electrically coupled to one terminal/electrode of the resonator 210 via a wire (e.g., the wire 110) extending through the passageway 108 in the retaining disk 106 and the crystal retainer 104 shown in FIGS. 1A and 1B. In alternative embodiments, the first port 310 may be electrically coupled to a terminal/electrode of the resonator 210 without using the passageway 108.

In some example embodiments, the first port 310 may be electrically coupled to a terminal/electrode of the resonator 210 of the pressure sensor 100 via an electrical connection 304. Similarly, the second port 312 of the network analyzer 302 may be electrically coupled to another terminal/electrode of the resonator 210 via an electrical connection 306. In some example embodiments, the electrical connection 304 may include a production tubing of an oil well, and the electrical connection 306 may include a casing of the oil well. For example, the casing of the oil well may be electrically connected to the housing (not shown) of the pressure sensor 100 when the pressure sensor 100 is positioned in the annulus between the casing and the production tubing.

In some example embodiments, the network analyzer 302 may send a signal to the resonator 210 via the electrical connection 306 and may receive the signal from the resonator 210 via the electrical connection 304. In some alternative embodiments, the network analyzer 302 may send a signal to the resonator 210 via the electrical connection 304 and may receive the signal from the resonator 210 via the electrical connection 306. The network analyzer 302 may vary the frequency of the signal provided to the resonator 210 to sweep through a range of frequencies to determine the resonance frequency of the resonator 210, which is indicative of the pressure sensed by the pressure sensor 100.

To illustrate, as explained above, the resonance frequency of the resonator 210 of the pressure sensor 100 depends on the pressure/load applied to the resonator 210. By performing calibration of the pressure sensor 100 to determine a reference resonance frequency of the resonator 210 that corresponds to a reference fluid pressure of the outside fluid that is monitored for pressure, changes in the fluid pressure of the outside fluid may be determined by determining changes in the resonance frequency of the resonator 210. For example, the amount of change in the fluid pressure may be determined based on the particular resonance frequency relative to the reference resonance frequency. In some example embodiments, the pressure sensor 100 may be connected to the outside fluid that is monitored for pressure via the pipe 308.

By performing a frequency sweep (i.e., by varying the frequency) of the signal generated by the network analyzer 304 and processing the signal received by the network analyzer 304 through the pressure sensor 100 (i.e., through the resonator 210), the resonance frequency that is indicative of the fluid pressure may be determined. The resonance frequency of the resonator 210 may be determined by processing the signal, after the signal is received by the network analyzer 302, to determine one or more parameters, such as voltage level, power, and/or frequency of the signal.

Because pressure readings may be temperature dependent, a temperature sensitive crystal of the resonator 210 allows for the consideration of thermal effects that result in a reliable pressure reading. Temperature crystals can be of the canned type or mounted exposed to mimic the heat transfer mechanism/path of the crystal for more accurate pressure readings during a transient thermal phase (i.e., when pressure sensor 100 is being heated/cooled by steam injection process).

In an example embodiment, the network analyzer 302 can process the signal received through the pressure sensor 100 to determine one or more parameters and to further determine the pressure sensed by the pressure sensor 100 based on the one or more parameters. Alternatively, the network analyzer 302 may determine the one or more parameters of the signal and pass the parameter(s) and/or other information to another device to determine the pressure of a fluid sensed by the pressure sensor 100. Those of skill in the art will appreciate that a conventional computing device comprising one or more processors and one or more memories may be included in or operate with the network analyzer 302. Network analyzer 302 may also include communications modules for wired or wireless communications with other local or remote computing devices.

In some alternative embodiments, instead of the network analyzer 302, separate signal source and signal receiver may be used to send and receive the signal to/from the pressure sensor 100. Further, in some embodiments, the connection 306 may be at an electrical ground potential and may be coupled to an electrical ground.

Figure 4:
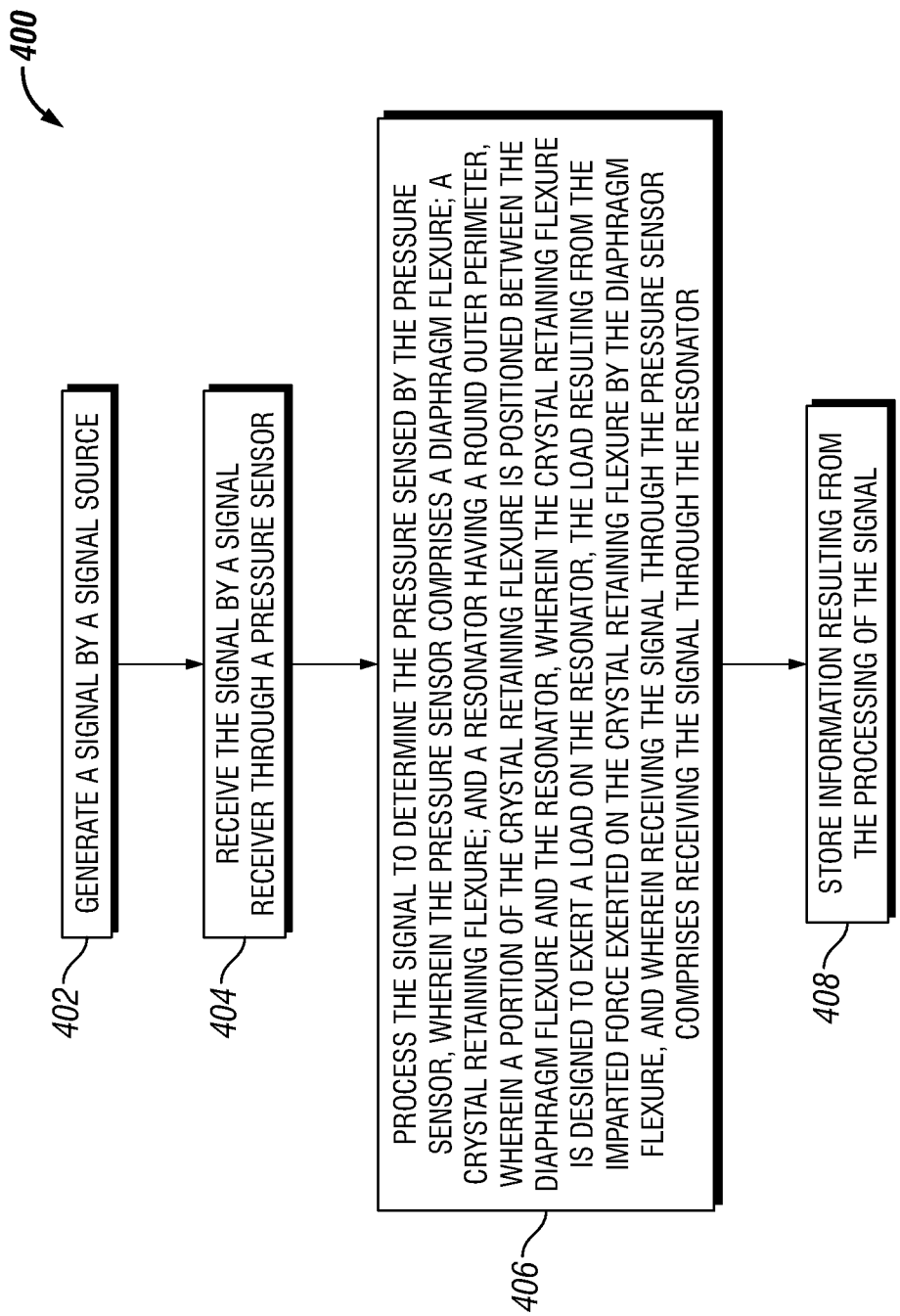
FIG. 4 illustrates a method for measuring a pressure of a fluid in accordance with an example embodiment.

FIG. 4 illustrates a method 400 for measuring a pressure of a fluid in accordance with an example embodiment. The method 400 includes generating a signal by a signal source, at 402. For example, the network analyzer 302 of FIG. 3 may generate a signal that is provided to a resonator (e.g., the resonator 210 of FIG. 2) of the pressure sensor 100 of FIGS. 1A-1C. The method 400 also includes receiving the signal by a signal receiver through a pressure sensor, at 404. For example, the network analyzer 302 may receive the signal through the pressure sensor 100. To illustrate, the network analyzer 302 may receive the signal through the resonator 210.

The method 400 further includes processing the signal to determine the pressure sensed by the pressure sensor, at 306. For example, the network analyzer 302 of FIG. 3 may process the signal received through the resonator 210 to determine the pressure sensed by the pressure sensor 100. For example, processing the signal to determine the pressure sensed by the pressure sensor may include determining one or more parameters of the signal, such as the voltage level, power, and/or frequency of the signal at one or both of the signal source and the signal receiver. To illustrate, processing the signal may include determining a voltage level of the signal after the signal is received by the signal receiver. In some example embodiments, the method 400 also includes varying a frequency of the signal by the signal source to determine the resonance frequency of the resonator of the pressure sensor 100. For example, the pressure sensed by the pressure sensor 100 can be determined based on the frequency of the signal, which may be indicative of the pressure sensed by the pressure sensor when the frequency of the signal matches the resonant frequency of the resonator 210 of the pressure sensor 100, as described above.

At 408, the method 400 concludes with storing the information resulting from the processing. For example, the information may be stored in a memory, such as a static random access memory.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A pressure sensor for sensing pressure of a fluid, the pressure sensor comprising:
   a diaphragm flexure;
   a crystal retaining flexure, wherein the diaphragm flexure is designed to exert an imparted force on the crystal retaining flexure and wherein the imparted force is proportional to a fluid pressure exerted on the diaphragm flexure; and
   a disk resonator having a round outer perimeter, wherein a portion of the crystal retaining flexure is positioned between the diaphragm flexure and the resonator, and wherein the crystal retaining flexure is designed to exert a load on the resonator, the load resulting from the imparted force exerted on the crystal retaining flexure by the diaphragm flexure.

2. The pressure sensor of claim 1, wherein the diaphragm flexure is in contact with the crystal retaining flexure and wherein the crystal retaining flexure is in contact with a portion of the round perimeter of the resonator.

3. The pressure sensor of claim 1, wherein the diaphragm flexure is designed to move toward the crystal retaining flexure in response to an increase in the fluid pressure, wherein the crystal retaining flexure is designed to move toward the resonator in response to an increase in the imparted force, and wherein the resonator is designed to oscillate at a resonant frequency in response to the load exerted onto the resonator.

4. The pressure sensor of claim 3, further comprising a chamber at least partially bounded by the diaphragm flexure, wherein the fluid pressure is exerted by a fluid contained in the chamber and wherein the fluid is isolated from the crystal retaining flexure and the resonator.

5. The pressure sensor of claim 4, further comprising a pressure head having a fluid inlet and a channel, wherein the channel extends between the fluid inlet and the chamber.

6. The pressure sensor of claim 5, wherein the diaphragm flexure, the crystal retaining flexure, the resonator, and at least a portion of the pressure head are positioned within a housing.

7. The pressure sensor of claim 4, wherein the fluid is a hydraulic fluid separated from an outside fluid that exerts external fluid pressure that is sensed by the pressure sensor.

8. The pressure sensor of claim 3, wherein the load exerted on the resonator is proportional to the imparted force exerted on the crystal retaining flexure.

9. The pressure sensor of claim 1, wherein the diaphragm flexure comprises a protrusion that is in contact with the crystal retaining flexure.

10. A system for measuring a pressure of a fluid, the system comprising:
    a signal source;
    a signal receiver; and
    a pressure sensor comprising:
       a diaphragm flexure;
       a crystal retaining flexure, wherein the diaphragm flexure is designed to exert an imparted force on the crystal retaining flexure, wherein the imparted force is proportional to a fluid pressure exerted on the diaphragm flexure; and
       a disk resonator having a round outer perimeter, wherein a portion of the crystal retaining flexure is positioned between the diaphragm flexure and the resonator, and wherein the crystal retaining flexure is designed to exert a load on the resonator, the load resulting from the imparted force exerted on the crystal retaining flexure by the diaphragm flexure, and wherein the resonator is electrically coupled to the signal source and to the signal receiver.

11. The system of claim 10, wherein the crystal retaining flexure is coupled to a ground potential electrode of the resonator and wherein a positive potential is coupled to a second electrode of the resonator.

12. The system of claim 10, wherein the resonator is a quartz resonator and wherein the signal source is configured to vary a frequency of a signal provided to the resonator.

13. The system of claim 10, wherein the resonator is disk-shaped and wherein the signal source is configured to vary a frequency of a signal provided to the resonator.

14. The system of claim 10, wherein the pressure sensor further comprises a chamber at least partially bounded by the diaphragm flexure, wherein the fluid pressure is exerted by a fluid contained in the chamber, wherein the fluid is isolated from the crystal retaining flexure and the resonator, and wherein the load exerted on the resonator is proportional to the imparted force exerted on the crystal retaining flexure.

15. The system of claim 14, wherein the pressure sensor further comprises a pressure head having a fluid inlet and a channel and wherein the channel extends between the fluid inlet and the chamber.

16. The system of claim 14, wherein the fluid is a hydraulic fluid separated from an outside fluid that exerts external fluid pressure that is sensed by the pressure sensor.

17. A method for measuring a pressure of a fluid, the method comprising:
   generating a signal by a signal source;
   receiving the signal by a signal receiver through a pressure sensor;
   processing the signal to determine the pressure sensed by the pressure sensor, the pressure sensor comprising:
      a diaphragm flexure;
      a crystal retaining flexure; and
      a disk resonator having a round outer perimeter, wherein a portion of the crystal retaining flexure is positioned between the diaphragm flexure and the resonator, wherein the crystal retaining flexure is designed to exert a load on the resonator, the load resulting from an imparted force exerted on the crystal retaining flexure by the diaphragm flexure, and wherein receiving the signal through the pressure sensor comprises receiving the signal through the resonator.

18. The method of claim 17, wherein the pressure sensor further comprises a chamber at least partially bounded by the diaphragm flexure, wherein a fluid pressure is exerted by a fluid contained in the chamber, wherein the fluid is isolated from the crystal retaining flexure and the resonator.

19. The method of claim 17, further comprising varying a frequency of the signal by the signal source.

20. The method of claim 19, wherein processing the signal includes determining a voltage level of the signal after the signal is received by the signal receiver.

* * * * *